United States Patent [19]

Whiteside et al.

[11] 4,235,539
[45] Nov. 25, 1980

[54] PHOTOGRAPHIC EXPOSURE CONTROL SYSTEM UTILIZING A SINGLE PHOTOCELL FOR THREE DISTINCT PURPOSES

[75] Inventors: George D. Whiteside, Lexington; Bruck K. Johnson, Andover; Arthur G. LaRocque, Belmont, all of Mass.

[73] Assignee: Polaroid Corporation, Cambridge, Mass.

[21] Appl. No.: 6,423

[22] Filed: Jan. 24, 1979

Related U.S. Application Data

[63] Continuation-in-part of Ser. No. 960,062, Nov. 13, 1978, Pat. No. 4,192,587, and Ser. No. 487, Jan. 2, 1979.

[51] Int. Cl.³ .............. G03B 7/097; G03B 7/099; G03B 15/05; G03B 17/20
[52] U.S. Cl. .............................. 354/27; 354/53; 354/60 L; 354/60 F; 354/127
[58] Field of Search ............... 354/27, 53, 60 L, 60 F, 354/127

[56] References Cited

U.S. PATENT DOCUMENTS

| | | | |
|---|---|---|---|
| 3,478,660 | 11/1969 | Land | 354/27 |
| 3,628,437 | 12/1971 | Fahlenberg | 354/258 |
| 3,942,183 | 3/1976 | Whiteside | 354/29 |
| 3,977,014 | 8/1976 | Norris | 354/29 |
| 3,997,904 | 12/1976 | Schutze et al. | 354/60 L X |
| 4,001,845 | 1/1977 | Maitani et al. | 354/60 L X |
| 4,023,187 | 5/1977 | Shenk | 354/27 |
| 4,040,072 | 8/1977 | Johnson et al. | 354/173 |
| 4,064,519 | 12/1977 | Kee | 354/141 |
| 4,079,389 | 3/1978 | Hashimoto et al. | 354/60 F X |

OTHER PUBLICATIONS

U.S. Applic. Ser. No. 840,802, 10/77, Muggli.
U.S. Applic. Ser. No. 839,839, 10/77, Johnson.
U.S. Applic. Ser. No. 929,840, 7/78, Johnson.
U.S. Applic. Ser. No. 854,691, 11/77, Johnson.
U.S. Applic. Ser. No. 898,546, 4/78, Biber et al.
U.S. Applic. Ser. No. 919,084, 6/78, Johnson.

*Primary Examiner*—Michael L. Gellner
*Attorney, Agent, or Firm*—Edward S. Roman

[57] ABSTRACT

A photographic camera apparatus includes an improved exposure and electronic flash fire control system comprising a single photoresponsive element. The system provides a scene brightness measurement prior to a photographic exposure interval, an exposure influencing event during the exposure interval responsive to the photoresponsive element providing an indication of the commencement of the photographic exposure interval and an exposure terminating signal responsive to the photoresponsive element detecting a selected amount of scene light corresponding to the exposing scene light admitted during the exposure interval.

8 Claims, 8 Drawing Figures

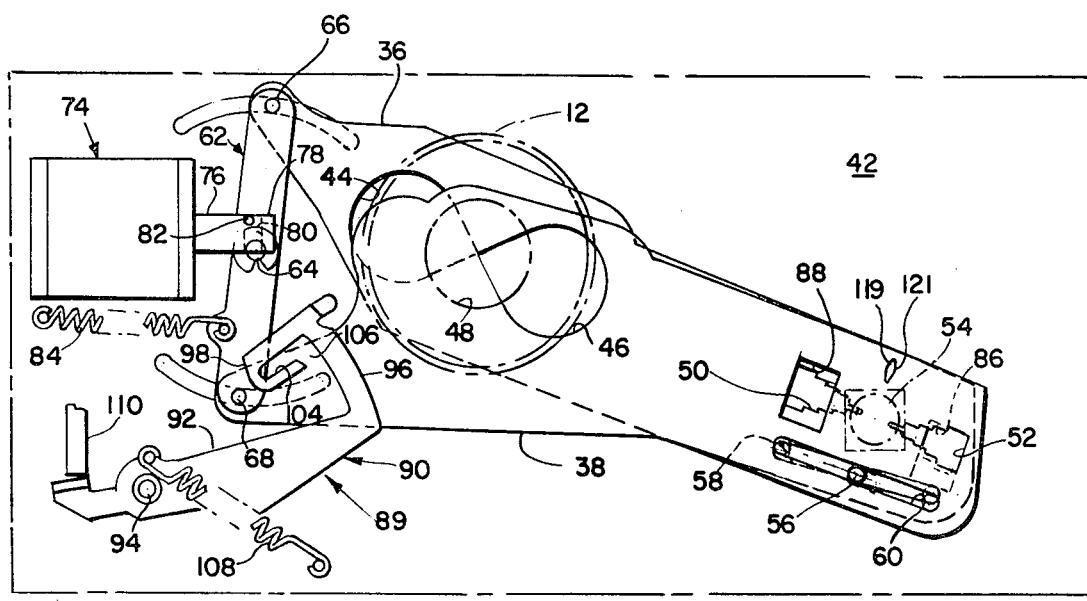
FIG. 7
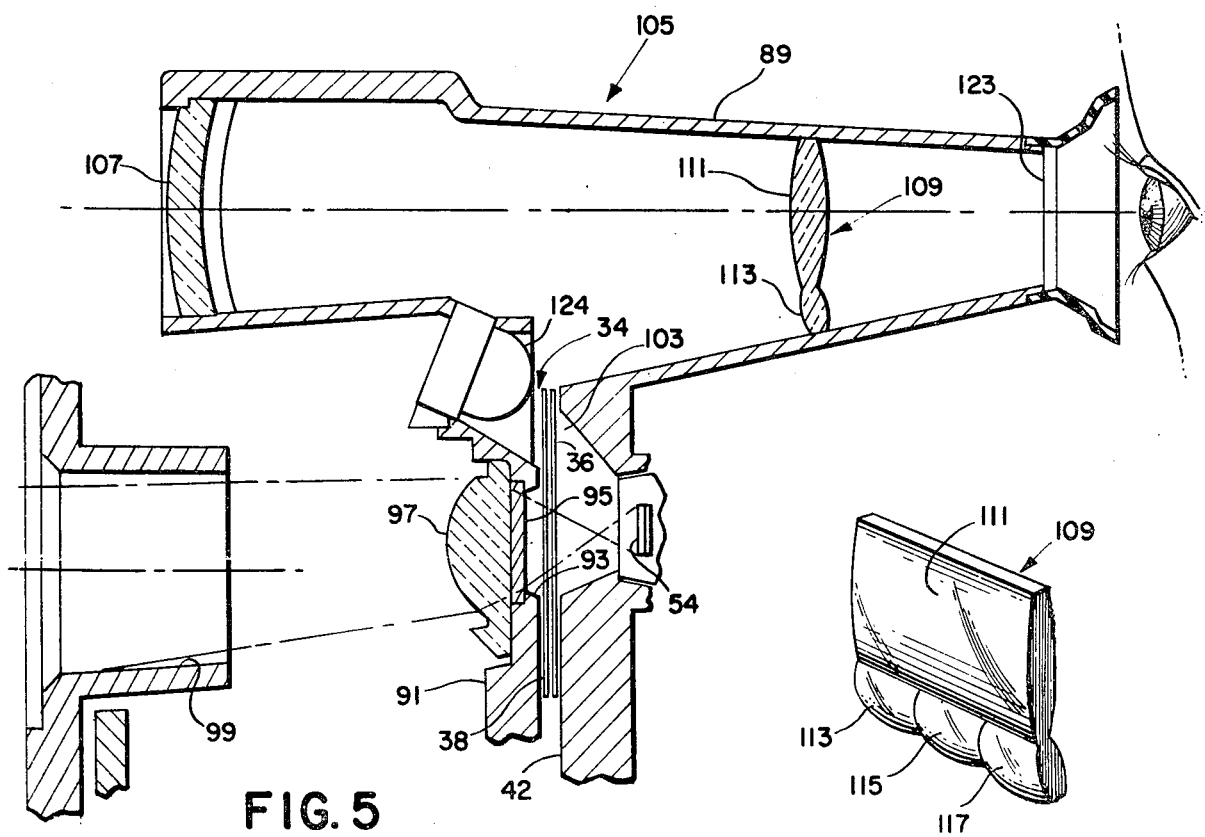
FIG. 5
FIG. 6

PHOTOGRAPHIC EXPOSURE CONTROL SYSTEM UTILIZING A SINGLE PHOTOCELL FOR THREE DISTINCT PURPOSES

CROSS REFERENCE TO RELATED PATENT APPLICATION

This application is a continuation-in-part of U.S. patent application Ser. No. 960,062, filed Nov. 13, 1978, entitled "Proportional Fill Flash" by Arthur G. LaRocque et al., filed in common assignment herewith, now U.S. Pat. No. 4,192,587 and U.S. patent application Ser. No. 487, filed Jan. 2, 1979 entitled "Photographic Camera with Dual Purpose Light Indicator" by Arthur G. LaRocque et al., also filed in common assignment herewith.

BACKGROUND OF THE INVENTION

1. Field of the Invention

This invention relates generally to a photographic camera exposure control system with a multipurpose photocell and, more particularly, to a photographic camera exposure control system wherein a single photocell is utilized for three distinct purposes.

2. Description of the Prior Art

In the photographic art, exposure control systems embodying scanning shutter blade elements which operate to vary exposure aperture areas with time during the exposure interval are well known as indicated by U.S. Pat. No. 3,942,183 entitled "Camera with Pivoting Blades", by G. Whiteside, issued Mar. 2, 1976 in common assignment herewith. Such scanning shutter blade mechanisms generally include a pair of counter reciprocating shutter blade elements each having a primary aperture that traverses the optical axis of the camera during the exposure interval. The primary apertures are shaped so that upon overlying one another during counter movement of the blades, there is defined an effective exposure aperture value which increases to a maximum value in a determinate period of time.

Exposure control is provided by a pair of secondary photocell apertures in respective shutter blade elements which admit scene light to a photoresponsive element in correspondence with the scene light admitted to the focal plane during shutter blade movement through an exposure cycle. The output from the photoresponsive element is directed to an integrator circuit which triggers upon reaching an integration level corresponding to a desired exposure value to terminate the exposure interval by returning the shutter blade elements back to their initial scene light blocking position.

Shutter mechanisms of the aforementioned type are often arranged to operate in synchronism with a source of artificial illumination such as an electronic flash or strobe. The shutter blade mechanism and strobe are generally arranged to operate in either a high ambient scene light intensity mode of operation where no artificial illumination is provided or a low ambient scene light intensity mode of operation where the strobe is fired to provide a source of artificial illumination. Under conditions of low ambient scene light intensity where the strobe is expected to be fired, the scanning shutter blade mechanism may be stopped at an aperture value corresponding to the camera-to-subject distance as determined by focusing the objective lens. Systems of the aforementioned type are generally referred to as "follow focus" systems and the maximum aperture to which the scanning shutter blade elements are allowed to open is controlled by the rangefinding or focusing system of the camera in a manner as is more fully disclosed in U.S. Pat. No. 3,977,014, entitled "Follow Focus Exposure Control System with Improved Uniform Trim Control", by P. Norris, issued Aug. 24, 1976 in common assignment herewith.

Such a system need not actually stop the opening shutter blade movement at a maximum effective exposure aperture as determined by the rangefinding or focusing system of the camera, but may, instead, vary the time at which the strobe light is fired during the opening shutter blade movement as determined in correspondence with the rangefinding or focusing system of the camera. Since the duration of the strobe light is short in comparison to the time required for the shutter blade mechanism to scan from its scene light blocking position to its maximum exposure aperture defining position, the aperture defined by the shutter blade elements at the instant of strobe firing for practical purposes constitutes the effective aperture by which the exposure occurs. Such a system is more fully described in U.S. Pat. No. 3,478,660, entitled "Photographic Apparatus with Flash Exposure Control System", by E. Land, issued Nov. 18, 1969 in common assignment herewith. Range responsive flash firing systems of the aforementioned type can also be utilized in conjunction with sonar rangefinding devices as more fully described in U.S. patent application Ser. No. 898,546, entitled "Range Synchronized Flash Photographic Apparatus and Method for Achieveing Optimum Exposure", filed Apr. 21, 1978 in common assignment herewith.

Exposure and artificial illumination control systems of the aforementioned type are generally intended to provide a source of artificial illumination only during the low ambient scene light intensity mode of operation. However, there may also be conditions during high ambient scene light intensity modes of operation wherein it becomes desirable to provide artificial illumination to fill in the photographic subject against a brightly back lit scene as is more fully disclosed in U.S. Pat. No. 4,023,187, entitled "Exposure Control System with Fill Flash Race Condition", by E. Shenk, issued May 10, 1977 in common assignment herewith. The aforementioned artificial illumination control system operates under conditions of low ambient scene light intensity to fire the strobe light at a predetermined time period subsequent to the initiation of the exposure interval and under conditions of high ambient scene light intensity to fire the strobe light as a consequence of the time integration of the scene light intensity incident to the photoresponsive element reaching a predetermined value.

In such exposure and artificial illumination control systems, it may be preferable to automatically determine whether the ambient scene light intensity is high or low prior to exposure and to thereafter pursue an exposure control mode of operation particularly suited to the ambient scene light condition so detected. Toward this end it would ordinarily be expected to provide a separate preexposure brightness measuring circuit including a photoresponsive element. In order to thereafter directly control the photographic exposure interval, it is necessary to also detect the scene light admitted to the exposure plane either directly or indirectly through corresponding photocell apertures which might require an additional photoresponsive element. In addition, in order to fire a strobe light at a predetermined period subsequent to the initiation of the exposure interval, it becomes necessary to provide some means for signalling the exposure control circuit at the commencement of the exposure interval. Toward this end it is convenient to utilize an LED, photocell combination as more fully disclosed in U.S. Pat. No. 3,628,437 entitled "Photographic Camera" issued Dec. 21, 1971.

Therefore, it is a primary object of this invention to provide an exposure and artificial illumination control system wherein: the ambient scene light intensity is initially measured prior to the photographic exposure interval, a signal is thereafter provided to indicate the commencement of the exposure interval by detecting the light from an LED, and the duration of the exposure interval is thereafter controlled by detecting scene light in correspondence with the scene light admitted to the film plane, all of which is accomplished through the use of a single photoresponsive element or cell.

Other objects of the invention will be in part obvious and will in part appear hereinafter. The invention accordingly comprises a mechanism and system possessing the construction, combination of elements and arrangement of parts which are exemplified in the following detailed disclosure.

SUMMARY OF THE INVENTION

A camera adapted to be energized at least in part by a source of electrical energy and including means for defining a film plane comprises a single photoresponsive element stationed to receive light from the scene to be photographed in order to provide an output signal having an electrical characteristic which varies as a function of the intensity of the scene light incident thereon. An exposure control means is provided for controlling the admission of scene light to the film plane to define an exposure interval and for controlling the admission of scene light to the photoresponsive element prior to the commencement of the exposure interval and during the exposure interval in correspondence with the scene light admitted to the film plane. The exposure control also includes means for directing artificial light, as from an LED, to impinge upon the photoresponsive element at the instant that the exposure interval is commenced. The control responds to the electrical characteristic of the photoresponsive element upon the receipt thereof of the artificial light at the commencement of the exposure interval to subsequently provide an exposure influencing operation such as the firing of a flash of artificial light. The control subsequently responds to the electrical characteristic of the photoresponsive element upon the receipt of scene light during the exposure interval to control the duration of the interval. The control also responds to the electrical characteristic of the photoresponsive element upon the receipt thereof of scene light prior to the commencement of the exposure interval to control the manner in which the exposure influencing operation is provided. Where the exposure influencing operation involves firing the flash of artificial light, then the time at which the light is flashed during the exposure interval may be controlled.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 5 is a cross-sectional view taken along the lines 5—5 of FIG. 2.

FIG. 6 is a perspective showing the lens arrangement of FIG. 5.

FIG. 7 is a front elevational view showing portions of the shutter blade mechanism of FIG. 2 in still another position.

DESCRIPTION OF THE PREFERRED EMBODIMENT

Figure 1:
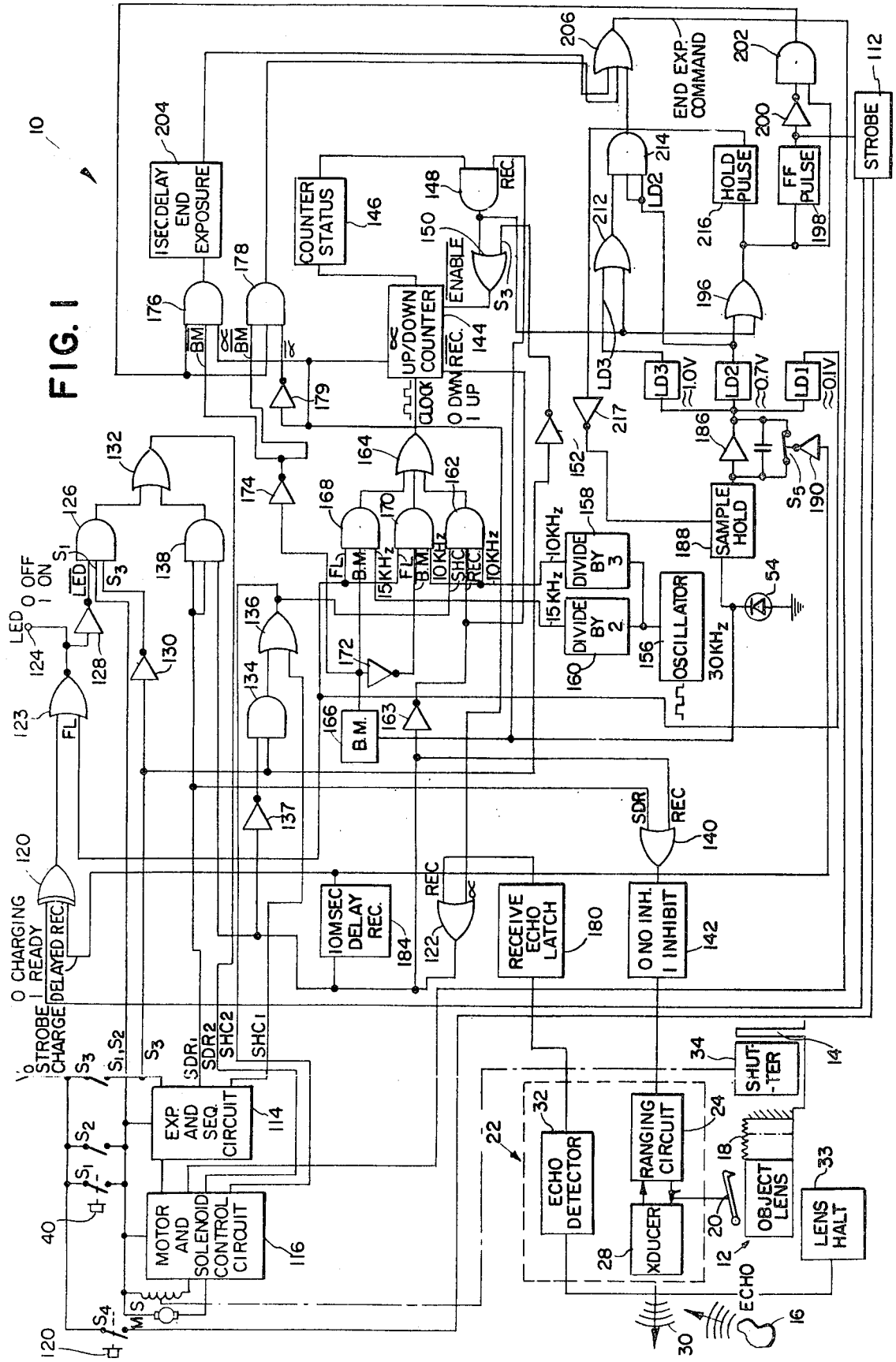
FIG. 1 is a schematic circuit diagram of the photographic control system and apparatus of this invention.

Referring now to FIG. 1 there is shown at 10, a schematic circuit diagram for the photographic camera apparatus of this invention. The camera apparatus 10 includes an objective lens arrangement or assembly, as shown in simplified fashion at 12, disposed for movement between a plurality of different focal positions. During each film exposure operation, the objective lens assembly 12 is displaced to one of its focal positions for focusing at a focal plane 14, image forming light rays from a respective photographic subject as shown at 16 located within a given range of distances from the camera apparatus. As is readily apparent, the lens assembly 12 is adapted at each of its plurality of focal positions to focus at the focal plane 14 of the camera, an image of a photographic subject located at a different distance from the camera within the given range of distances.

The lens assembly 12 is biased to move through its plurality of different focal positions by a tension spring 18 and may be held at an initial terminal position as shown in solid lines by a releasable latch 20. The spring 18 operates to bias the lens assembly 12 to move toward another terminal position as shown by the phantom lines. The lens assembly 12 while in its initial terminal position (solid lines), operates to focus image forming light rays from a photographic subject located at the closest possible distance to the camera within the aforementioned camera-to-subject distance range and while in its other terminal position (phantom lines) operates to focus image-forming light rays from a photographic subject located at the furthest possible distance from the camera within the aforementioned camera-to-subject distance range. The movement of the lens assembly 12 from its initial terminal position toward its other terminal position operates to progressively focus image-forming rays for corresponding subjects located at progressively increasing distances from the camera.

The photographic apparatus 10 is also provided with a sonic rangefinder as shown generally at 22 and which is more fully disclosed in copending U.S. patent applications Ser. Nos. 840,802 entitled "Ultra-sonic Ranging System For a Camera" by J. Muggli and Ser. No. 919,084 entitled "Sonar Controlled Lens Focus Apparatus" by B. Johnson, et al filed June 26, 1978 in common assignment herewith. The sonic rangefinder 22 includes a ranging circuit 24 which may be actuated in a manner to be herein described to issue a transmit commence signal to a sonic transducer 28 so as to cause the transmission of a sonar ranging signal comprising a burst of sonic energy as shown at 30. The transducer 28 thereafter operates to detect an echo signal reflected from the photographic subject 16 at an elapsed time interval subsequent to the transmission of the sonar ranging signal. An echo detector 32 then provides a signal indicative of this elapsed time period which corresponds directly to the distance between the camera and the subject 16 to be photographed. Thus, the sonic rangefinder 22 provides an indication of an elapsed time period which corresponds directly to the distance between the camera and the subject to be photographed for reasons which will become more apparent in the following paragraphs.

Intermediate the objective lens arrangement 12 and the focal plane 14, there is provided a shutter mechanism that is shown generally at 34 comprising two overlapping shutter blade elements 36 and 38 (see FIGS. 2-4) of the so-called scanning type which will be subsequently described in greater detail herein. The photographic camera apparatus is also provided with a photographic cycle initiating button as shown at 40 in FIG. 1 wherein the depression of the button 40 operates to commence an exposure interval by ultimately effecting the release of the shutter blade elements 36 and 38 in a manner to be subsequently described herein.

Figure 2:
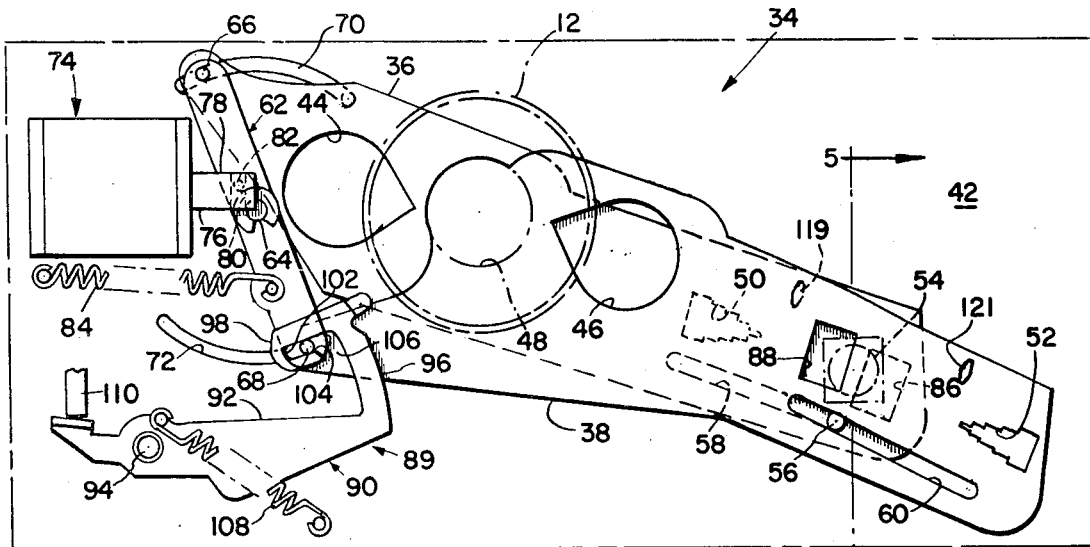
FIG. 2 is a front elevational view showing portions of the shutter blade mechanism of FIG. 1.
Figure 3:
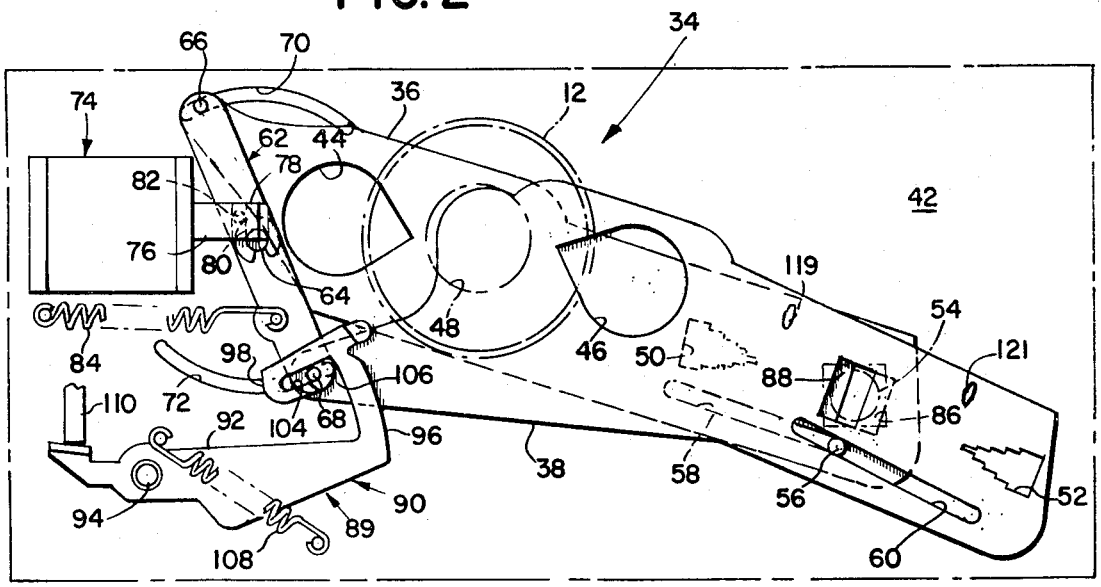
FIG. 3 is a front elevational view showing portions of the shutter blade mechanism of FIG. 2 at a different position.
Figure 4:
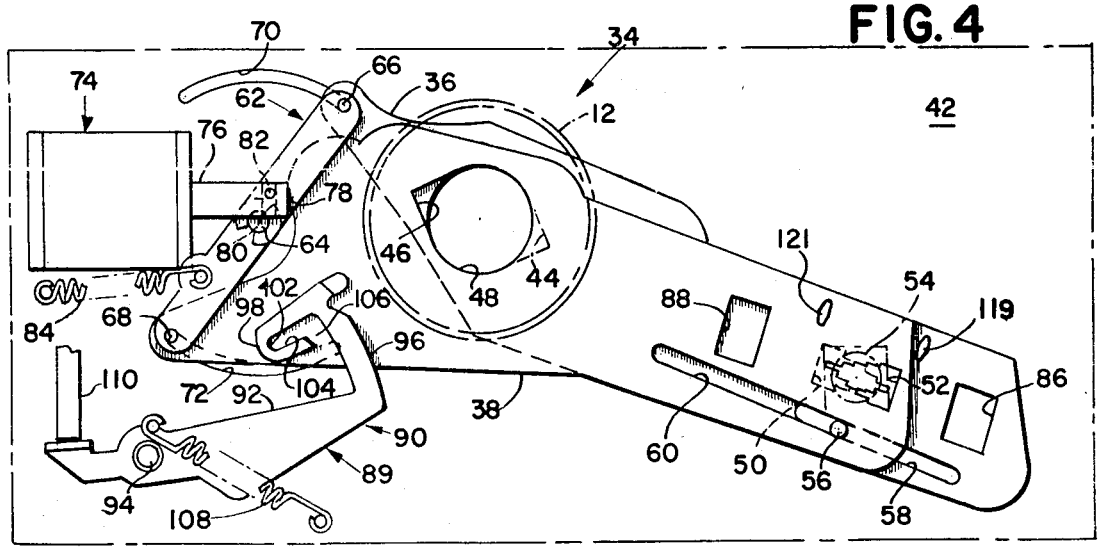
FIG. 4 is a front elevational view showing portions of the shutter blade mechanism of FIG. 2 in still another position.

Referring now to FIGS. 2-4, it can be seen that a pair of scene light admitting primary apertures 44 and 46 are provided respectively in the blade elements 36 and 38 to collectively define a progressive variation of effective aperture openings in accordance with simultaneous longitudinal and lateral displacement of one blade element with respect to the other blade element in a manner as is fully described in U.S. Pat. No. 3,942,183 entitled "Camera with Pivoting Blades" by George D. Whiteside, issued Mar. 2, 1976 and assigned in common herewith. The apertures 44 and 46 are selectively shaped so as to overlap a light entering exposure opening 48 in a baseblock casting 42 thereby defining a gradually varying effective aperture size as a function of the position of the blade elements 36 and 38.

Each of the blades 36 and 38 may additionally be configured to have corresponding photocell sweep secondary apertures shown respectively at 50 and 52. Secondary apertures 50 and 52 may be configured in correspondence with the shapes of scene light admitting primary apertures 44 and 46. As is readily apparent, the secondary apertures 50 and 52 also move in correspondence with the primary apertures 44 and 46 to define a small secondary aperture for admitting the passage of scene light to a light detecting or photoresponsive element 54 stationed in the base block as best seen in FIG. 5.

Projecting from the baseblock casting 42 at a location spaced laterally apart from the light entering exposure opening 48, is a pivot pin or stud 56 which pivotally and translatably engages elongated slots 58 and 60 formed in respective shutter blade elements 36 and 38. Pin 56 may be integrally formed with the baseblock casting 42 and blade elements 36 and 38 may be retained in engaging relation with respect to the pin 56 by any suitable means such as peening over the outside end of the pin 56.

The opposite ends of the blade elements 36 and 38 respectively include extended portions which pivotally connect to a walking beam 62. The walking beam 62, in turn, is disposed for rotation relative to the baseblock casting 42 by pivotal connection to a projecting pivot pin or stud 64 which may be integrally formed with the baseblock casting 42 at a location spaced laterally apart from the light entering exposure opening 48. The walking beam 62 may be pivotally retained with respect to the pin 64 by conventional means such as an E-ring (not shown). In the preferred mode, the walking beam 62 is pivotally connected at its distal ends to the shutter blade elements 36 and 38 by respective pin members 66 and 68 which extend laterally outward from the walking beam 62. Pin members 66 and 68 are preferably circular in cross-section and extend through respective openings in respective blade elements 36 and 38 so as to slidably engage respective arcuate tracks 70 and 72 which may be integrally formed within the baseblock casting 42. The arcuate tracks 70 and 72 operate to inhibit disengagement of the blade elements 36 and 38 from their respective pin members 66 and 68 during operation of the exposure control system. Thus, the walking beam 62 and shutter blade elements 36 and 38 collectively define a blade mechanism together with a means for mounting the blade mechanism for displacement including pivot pins 56 and 64.

Drive means are provided for displacing the blade mechanism 34 and include a tractive electromagnetic device in the form of a solenoid 74 employed to displace the shutter blades 36 and 38 with respect to each other and the baseblock casting 42. The solenoid 74 includes an internally disposed cylindrical plunger unit 76 which retracts inwardly into the body of the solenoid upon energization of the solenoid winding. The solenoid plunger 76 includes an end cap 78 at the outside end thereof together with a verticle slot or groove 80 within the end cap 78 for loosely engaging a pin 82 extending outwardly from the walking beam 62. In this manner, the solenoid plunger 76 is affixed to the walking beam 62 so that longitudinal displacement of the plunger 76 will operate to rotate the walking beam around the pivot pin 64 so as to appropriately displace the shutter blades 36 and 38. The drive means may additionally include a helical tension spring 84 so as to continuously urge the blade elements 36 and 38 into positions defining their largest effective aperture over the light entry exposure opening 48. As will be readily understood, in some shutter blade arrangements, it may be preferable to use a compression spring in place of the tension spring 84 in a manner as is shown in U.S. Pat. No. 4,040,072 entitled "Shutter Latch Arrangement Releasable Through Shutter Blade Actuation and Resettable Through Film Advancement", by B. Johnson, issued Aug. 2, 1977 in common assignment herewith. Thus, with the spring connection herein described, the exposure control system of this invention is biased to continuously urge the shutter blade elements 36 and 38 into an open orientation.

The shutter blade elements 36 and 38 are respectively provided with a third set of apertures 86 and 88 as is more fully described in U.S. patent application Ser. No. 854,691 entitled "An Exposure Control System for Use in a Photographic Camera", by B. Johnson, filed Nov. 25, 1977 filed in common assignment herewith. The third pair of apertures 86 and 88 overlap each other to provide an aperture of predetermined value that is aligned with the photoresponsive element 54 so as to permit passage of light from the scene to inpinge upon the photoresponsive element 54 when the shutter blades 36 and 38 are moved to the positions as shown in FIG. 3 in a manner to be more fully described in the following paragraphs.

In order that the shutter blade elements 36 and 38 may be maintained in their scene light blocking arrangement without requiring the continuous energization of the solenoid 74, there is provided a latch mechanism as shown generally at 89 comprising a latch member 90 having an elongated main body portion 92 disposed for rotation about a pivot pin or shaft 94 integrally molded with respect to the baseblock casting 94. The main body portion 92 includes an integral arm portion 96 extending outwardly therefrom into overlapping relation therewith to ultimately define an integral hook portion 98. Hook portion 98 is adapted for releasable engagement with a portion of the pin member 68 which extends laterally forward from the side of the walking beam 62.

More specifically, hook portion 98 defines a first edge surface 102 which engages pin member 68 so as to inhibit clockwise rotation of walking beam 62 about pin 64. In addition, hook portion 98 defines a second edge surface 104 which engages the bottom of pin member 68 to inhibit counterclockwise rotation of latch member 90 about its pivot pin 94. A latch release slot is shown generally at 106. The manner in which the walking beam 62 may be released from the hook portion 98 is more fully described in U.S. Pat. No. 4,040,072, supra.

Latch member 90 is resiliently biased for yieldable clockwise rotation about its pivot pin 94 by a tension spring 108, one end of which engages the latch member 90 and the other end of which is fixedly connected with respect to the baseblock casting 42. A return actuator as shown generally at 110 is provided for releasing the latch member 90 against the yieldable bias of tension spring 108 in a manner as is more fully described in U.S. Pat. No. 4,040,072, supra.

Referring now to a cross-sectional view of FIG. 5 there can be seen to be stationed forward of the baseblock 42, a lens plate 91 having a scene light admitting aperture 93 therethrough in general optical alignment with the photocell 54. An infrared filter 95 is fixedly stationed within the aperture 93 so as to filter scene light admitted to the photocell 54 by way of the secondary sweep photocell apertures 50 and 52. Forward of the infrared filter 95, there is provided a photometer lens 97 for receiving scene light from an opening 99 in the camera housing.

An artificial light source 124 is fixedly disposed above the infrared filter 95 in a complementary opening in the lens plate 91. The artificial light source 124 is preferably a light emitting diode (LED) and provides light to the photoresponsive element 54 by way of a passageway 103 as defined between the lens plate 91 and the baselock casting 42. In this manner, means are provided for directing light from the LED 124 to the photoresponsive element 54 without filtering the infrared light from the LED 124. As is readily apparent, the shutter blade elements 36 and 38 extend into the passageway 103 to block the light from the LED 124 from reaching the photoresponsive element 54. The shutter blade elements 36 and 38 are provided respectfully with a fourth pair of apertures 119 and 121 which may be moved into overlapping relationship with respect to each other to admit the light from the LED 124 to the photoresponsive element 54 at the initiation of the exposure interval in a manner as will be more fully described in the following discussion.

The camera apparatus 10 also includes a viewfinder as shown generally at 105 of the reversed Galilean telescope type as is more fully described in U.S. patent application Ser. No. 929,840 entitled "Trim Viewing Mechanism", by B. Johnson. The viewfinder 105 is disposed within an elongated hollow housing 89 and includes an objective negative lens 107 disposed at the forward open end of the housing 89 which is optically structured to form a virtual image of a scene which is generally coextensive with the scene to be photographed by way of the camera objective lens arrangement 12. A multi-focus integral eye lens 109 is fixedly stationed for viewing the virtual image of the scene to be photographed by way of an eye relief aperture 123 at the rear of the viewfinder housing 89. The multi-focus integral eye lens 109 comprises a primary viewfinder positive eye lens portion 111 aligned along the optical axis of the objective lens 107 for viewing the scene to be photographed in a wellknown manner. Below the primary viewfinder eye lens portion 111, there are provided three smaller eye lens portions 113, 115 and 117 as best shown in FIG. 6. The eye lens portion 113 is aligned to accommodate viewing of the light from the LED 124 for reasons which will become more apparent from the following discussion. Another eye lens portion 115 provides a visual indication of the camera trim mechanism in a manner as is more fully described in U.S. patent application, Ser. No. 929,840, supra. The last of the eye lens portions 117 provides no immediate function but may be easily adapted to provide a third indicator to the photographer should such a function become desirable.

The camera is preferably provided with an integral electronic flash or strobe as shown schematically in FIG. 1 at 112. The strobe charging and triggering circuitry may be of a type well known in the art as is more fully disclosed in U.S. Pat. No. 4,064,519, entitled "Regulated Strobe for Camera with Sixth Flash Inhibit" issued Dec. 20, 1977 in common assignment herewith. The strobe 112 preferably derives charging power from a battery that is insertable within the camera in correspondence with the film pack or cassette in a manner that is well known in the art for Polaroid SX-70-type film cassettes and cameras.

The aforementioned film cassette battery is also preferably utilized to power the circuitry in FIG. 1 in its entirety by way of three switches $S_1$, $S_2$, and $S_3$ in a manner as is more fully described in U.S. Pat. No. 4,040,072, supra. The camera of this invention is also provided with an exposure and sequencing circuit 114 and a motor and solenoid control circuit 116 which operate in a manner also more fully described in U.S. Pat. No. 4,040,072, supra. As is readily apparent, the motor and solenoid control circuit 116 operates to control the energizing current delivered to the solenoid 74 and to a motor 118. The film units intended for use with the camera of this invention are preferably of the self-developing type and the motor 118 is provided to effect the advancement and processing of the self-developing film units in a well-known manner.

Figure 8:
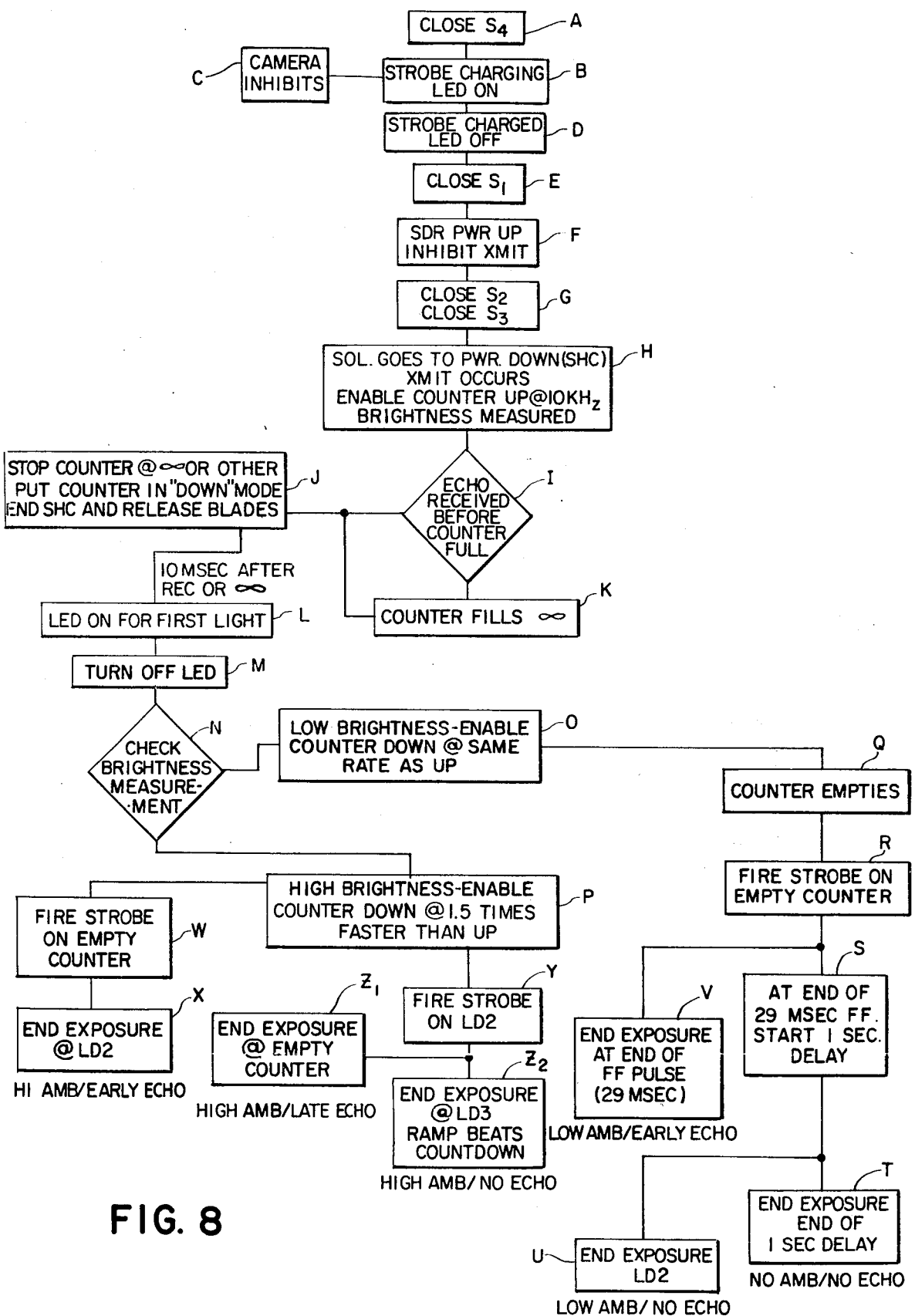
FIG. 8 is a flow chart showing an automatic sequence of operations for the exposure control apparatus of FIG. 1.

Referring now to FIG. 8 in conjunction with FIG. 1, there is shown a sequence of operations through which the camera is automatically guided to provide artificial illumination by way of the strobe 112 under varying conditions of ambient light intensity and camera-to-subject distance range. In order for a photographer to commence a photographic exposure cycle, he must first energize the strobe 112 by manually actuating a strobe charge button 120 (Block A) so as to close switch S₄ and effect the charging of the strobe 112 in a well-known manner. During the time that the strobe 112 is charging (Block B), a logic 0 signal level is provided by the strobe 112 to one input terminal, Strobe Charge, of an exclusive OR gate 120. During the strobe charge time, the other input terminal, Delayed Rec. to the exclusive OR gate 120 is also maintained at a logic 0 signal level for reasons which will become more apparent from the following discussion. Thus, the exclusive OR gate 120 provides a logic 0 output signal level which is directed to a NOR gate 123. The other input terminal FL to the NOR gate 123 is also maintained at a logic 0 signal level for reasons which will also become more apparent from the following discussion. Therefore, the output from the NOR gate 123 is switched at a logic 1 signal level so as to energize the LED 124 (Block B) during the time required for the strobe 112 to become fully charged.

The light from the LED 124 is made visible to the photographer from the viewfinder 105 by way of the eye lens 113 and thus provides him with a visual indication that the strobe 112 is in a state of charging and that the photographic cycle initiating button 40 should not be depressed. However, if the photographer should try to actuate the photographic cycle intiating button 40 prematurely prior to the strobe 112 reaching its fully charged condition while the LED 124 is energized, there may be provided a system for inhibiting the operation of the camera in a manner as is more fully described in U.S. Pat. No. 4,064,519, supra, as indicated in Block C, FIG. 8.

When the strobe 112 is fully charged in readiness for a photographic exposure cycle, there is provided a logic 1 level output signal to the exclusive OR gate 120 thereby switching the output from the exclusive OR gate 120 from a logic 0 signal level to a logic 1 signal level. This, in turn, switches the output from the NOR gate 123 from a logic 1 signal level to a logic 0 signal level therey turning off the LED 124 (Block D).

Once the LED 124 is deenergized, a photographer may initiate a photographic exposure cycle by manually actuating the button 40 so as to close the switch S₁ (Block E) in the manner as fully described in U.S. Pat. No. 4,040,072, supra. Closure of the switch S₁ energizes the exposure sequencing circuit 114 while simultaneously providing a logic 1 input signal level to one input terminal S₁ of an AND gate 126. The AND gate 126 has two other input terminals which at the instant of S₁ closing are also at logic 1 signal levels. One of the other input signals to the AND gate 126 at input terminal LED is derived from the LED 124 by way of an inverter 128 while the other input signal to the AND gate 126 at input terminal S₃ is derived from the open switch S₃ by way of another inverter 130. Thus, the output from the AND gate 126 is switched to a logic 1 signal level upon closure of the switch S₁. The output from the AND gate 126, in turn, is directed to an OR gate 132 so as to switch the output from the OR gate to a logic 1 signal level thereby providing a solenoid drive signal by way of a line SDR₂ to the motor and solenoid control circuit 116. The motor and solenoid control circuit 116, in turn, energizes the soneoid 74 (Block F) to retract the plunger 76 and rotate the walking beam 62 in a counterclockwise direction from its position as shown in FIG. 2 to its position as shown in FIG. 3.

Referring now to FIG. 3, it can be seen that the walking beam 62 has been rotated in a counterclockwise direction so as to displace the pin 68 out of engagement with the latching surfaces 104 and 102 and into alignment with the latch release slot 106. The latch member 90 is thereafter rotated in a counterclockwise direction about the pivot pin 94 by the actuator member 110 against the biasing force of tension spring 108 in a manner as is more fully described in U.S. Pat. No. 4,040,072, supra. In this manner, the latch member 90 is rotated in a counterclockwise direction from its position as shown in FIG. 3 to its position as shown in FIG. 4 so as to allow the subsequent rotation of the walking beam 62 in a clockwise direction toward its maximum aperture defining position. Movement of the actuator member 110 in the direction effecting release of the latch mechanism 89 also operates to simultaneously effect the closing of the switches S₂ and S₃ (Block G) in a manner as is again more fully described in U.S. Pat. No. 4,040,072 supra.

Closure of the switch S₃, in turn, operates to power down the solenoid 78 from the initial high current energization condition required to retract the plunger 76 to a low current energization condition (Block H) required to hold the plunger in its retracted position as shown in FIG. 3. The powering down of the solenoid 74 to a holding current mode (SHC) is accomplished as follows. Closure of the switch S₃ provides a logic 1 signal level to the inverter 130 which, in turn, provides a logic 0 signal level to the input terminal S₃ of the AND gate 126. This, in turn, switches the output of the AND gate 126 from a logic 1 signal level to a logic 0 signal level thereby switching the output from the OR gate 132 from a logic 1 signal level to a logic 0 signal level so as to eliminate the solenoid drive signal along the line SDR₂ to the motor solenoid control circuit 116. At the same time, a solenoid hold signal (SHC) is provided by the logic 1 signal level from the closed switch S₃ which operates to switch an AND gate 134 from a logic 0 output signal level to a logic 1 output signal level. The other input signal level to the AND gate 134 is derived from an inverter 137 and is already at a logic 1 signal level for reasons which will become apparent from the following discussion. Thus, the output logic 1 signal level from the AND gate 134 operates to switch an OR gate 136 to provide a logic 1 output signal level therefrom to the motor and solenoid control circuit 116 along a line SHC₂.

Powering down the solenoid 74 in the aforementioned manner from a solenoid drive current (SDR) to a solenoid holding current (SHC) also operates to actuate the sonar rangefinder 22 to transmit a sonar ranging signal 30 (Block H) in the following manner. Upon the initial closure of the switch S₁, the exposure and sequencing circuit 114 provided a logic 1 solenoid drive signal level along a line SDR₁ to an AND gate 138. Whereas the other input signal to the AND gate was already at a logic 0 signal level for reasons which will become apparent from the following discussion, the output signal from the AND gate 138 remained at a logic 0 signal level. The logic 1 solenoid drive signal level from the exposure and sequencing circuit 114 along SDR₁ was also directed to an input terminal, SDR, of an OR gate 140. Thus, the output from the OR gate 140 during the high current solenoid drive mode (SDR) subsequent to the closure of the switch S₁ and prior to the closure of the switches S₂ and S₃ operated to provide a logic 1 signal level output to a sonar inhibiting circuit 142 thereby inhibiting transmission of a sonar ranging signal by the sonic rangefinder 22 (Block F).

Closure of the switches S₂ and S₃ in the aforementioned manner powers down the solenoid 74 into its holding current mode (SHC) of operation and changes the logic 1 output signal level from the exposure and sequencing circuit 144 to the input terminal SDR of the OR gate 140 to a logic 0 output signal level thereby changing the output from the OR gate 140 to a logic 0 signal level so as to remove the inhibit imposed on the sonar rangefinding circuit 22 by the inhibit circuit 142. In this manner, the sonar rangefinding circuit 22 is actuated to issue a transmit commence signal to the sonic transducer 14 (Block H).

The latch 20 is withdrawn in response to the transmit command issued by the ranging circuit 24 thereby releasing the lens assembly 12 to move from its close-up focus position (solid lines) toward its far distance focus position (phantom lines). A lens halting mechanism as shown generally at 33 operates in response to the output of the echo detector 32 which detects the echo signal reflected from the photographic subject 16 at an elapsed time interval subsequent to the transmission of the sonar ranging signal (Block I). The latch mechanism 33 thereby operates to interupt the movement of the lens assembly 12 subsequent to its initial displacement from its close-up focus position at an elapsed time interval which correlates to the elapsed time interval between transmission of the sonar ranging signal and receipt of the echo from the photographic subject. The photographic subject will thus preferably be focused in the elapsed time interval (real time) between the transmission of the sonar ranging signal and the receipt of the echo by the sonic rangefinder 22. As will be readily understood, the dynamic characteristic of the lens assembly 12 drive, which in the aforementioned example constitutes the spring 18, operates to move the lens assembly 12 through its plurality of focal positions at a rate such that the lens assembly 20 reaches each one of its plurality of focal positions at substantially the same time at which an echo from the sonar ranging signal would be received by the echo detector 32 subsequent to being reflected from a subject located at the camera-to-subject distance directly corresponding to that one focal position.

Closure of the switches S₂ and S₃ in the aforementioned manner to power down the solenoid 74 to its holding current mode (SHC) also operates to enable an up-down counter as shown generally at 144 (Block H) in the following manner. As is readily apparent, the initial condition of the counter 144 is empty and a counter status circuit 146 senses the terminal count of the counter 144 and provides a logic 1 output signal as an indication that the up-down counter 144 is empty. The output from the counter status circuit 146 is directed to an AND gate 148 which, in turn, provides a logic 0 output signal level since the other input terminal $\overline{REC}$ thereto is at a logic 0 signal level prior to receipt of the ranging signal by the echo detector 32. The logic 0 output signal level from the AND gate 148, in turn, is directed to an OR gate 150. The other input terminal S₃ to the OR gate 150 is derived from the switch S₃ by way of an inverter 152 and thus assumes a logic 1 signal level prior to the closure of the switch S₃ and is thereafter changed to a logic 0 input signal level upon the closure of the switch S₃. The up-down counter 144 is disabled by a logic 1 input signal level from the OR gate 150 prior to the closure of the switch S₃ while the solenoid 74 is in its current driving mode (SDR) and is thereafter enabled to provide a count by a logic 0 output signal level from the OR gate 150 upon the closure of the switch S₃.

The count is provided to the up-down counter 144 by an oscillator 156 which provides a 30 KHz output clock pulse. The 30 KHz output clock pulse from the oscillator 156 is directed simultaneously to a first divider circuit 158 wherein the 30 KHz clock pulse is divided by 3 to provide an output clock pulse of 10 KHz and another divider circuit 160 wherein the 30 KHz clock pulse is divided by 2 to provide a 15 KHz output clock pulse for reasons which will become apparent from the following discussion. The 10 KHz clock pulse is directed to an input terminal, 10 KHz, of an AND gate 162 whereupon the output from the AND gate is directed to an OR gate 164. The AND gate 162 receives at another input terminal $\overline{REC}$ a logic 1 signal level from an inverter 164 prior to the receipt of the ranging signal by the echo detector 32 as will be more fully described in the following discussion. The remaining input terminal SHC to the AND gate 162 receives an input signal from the switch S₃ by way of the AND gate 134 and the OR gate 136. Thus, closure of the switch S₃ provides a logic 1 signal level to the input terminal SHC of AND gate 162 so as to enable the AND gate 162 to gate the 10 KHz clock pulse to the OR gate 164. The OR gate 164, in turn, gates the 10 KHz clock pulse into the up-down counter 144. The aforementioned logic 1 signal level from the inverter 163 is also directed to an up-down terminal of the counter 144 and operates to set the mode of the counter 144 to count "up" prior to receipt of the ranging signal by the echo detector 32. In this manner, the up-down counter 144 is actuated to count up the 10 KHz clock pulse at the instant that the sonar ranging signal is transmitted by the sonar rangefinding circuit 122.

As is readily apparent, movement of the shutter blade mechanism 34 from its position as shown in FIG. 2 to its position as shown in FIG. 3 also operated to move the third pair of apertures 86 and 88 into overlapping relationship with respect to each other so as to admit scene light to the photoresponsive element 54. The photoresponsive element 54 responds to the incident scene light and provides an output signal to a brightness measurement circuit 166 (Block H). The brightness measurement circuit 166, in turn, provides a logic 0 output signal level if the intensity of the detected scene light is below a determinate level and a logic 1 output signal level if the intensity of detected scene light is above the determinate level. The determinate level above which the brightness measuring circuit 166 provides a logic 1 signal level and below which it provides a logic 0 signal level is preferably established to be 10 Cd/ft².

The output signal from the brightness measurement circuit 166 is directed to an input terminal BM of a first AND gate 168 which receives a logic 1 signal level upon the measurement of a scene light intensity above 10 Cd/ft² and an input terminal $\overline{BM}$ of a second AND gate 170 which receives a logic 1 level input signal by way of an inverter 172 upon the measurement of a scene light intensity below 10 Cd/ft². The output from the brightness measurement circuit 166 is also directed by way of another inverter 174 to an input terminal $\overline{BM}$ of a first AND gate 176 and another input terminal $\overline{BM}$ of a second AND gate 178. The AND gates 176 and 178 thus receive a logic 1 signal level at their respective input terminals by way of the inverter 174 upon the measurement of a scene light intensity below 10 Cd/ft².

Receipt of the echo signal by the transducer 28 (Block I) signals the echo detector 32 to provide an output signal to trigger a receive echo latch circuit as shown generally at 180. The output from the receive echo latch circuit 180, in turn, is directed to an OR gate 122 and switches the output signal from the OR gate 122 from a logic 0 signal level to a logic 1 signal level upon the receipt of the echo signal by the sonar ranging circuit 22. The logic 1 output signal level from the OR gate 122, in turn, is inverted by the inverter 163 to a logic 0 signal level which in turn gates the AND gate 162 off so as to stop the 10 KHz clock pulse from being counted up by the up-down counter 144 (Block J). The change in the output signal from the inverter 163 from a logic 1 output signal level to a logic 0 output signal level also operates to change the counter 144 from an "up" mode of counting to a "down" mode of counting (Block J).

The output signal from the OR gate 122 is also directed to one input terminal of the AND gate 138 to ready the AND gate 138 to provide a logic 1 output signal level in response to a logic 1 input signal level being provided by the exposure and sequencing circuit 114 along the line $SDR_1$. The logic 1 output signal level from the OR gate 122, in turn, is inverted by the inverter 137 to a logic 0 input signal level to the AND gate 134. The output from the AND gate 134 is thus changed to a logic 0 signal level, in turn, switching the output signal from the OR gate 136 to a logic 0 output signal level. The output from the OR gate 136 is thereafter directed by way of a line $SHC_2$ to the motor and solenoid control circuit 116 to de-energize the solenoid 74 and commence the exposure cycle (Block J).

The output signal from the OR gate 122 is also delayed, preferably by 10 milliseconds, through a delay circuit 184. The delayed signal is thereafter directed to the exclusive OR gate 120 to switch the output therefrom from a logic 1 signal level to a logic 0 signal level. The logic 0 output signal level from the exclusive OR gate 120 is thereafter directed to the NOR gate 123 to switch its output signal level from a logic 0 to a logic 1. The logic 1 output signal level from the NOR gate 123, in turn, energizes the LED 124 for reasons which will become apparent from the following discussion.

In the event that the subject should be located at an infinite distance from the camera which by way of example may be considered to be any distance greater than 30 ft., then the counter 144 will fill and provide a logic 1 output signal level at terminal $\alpha$ (Block K). This logic 1 output signal level from the counter 144, in turn, will be directed to an input terminal $\alpha$ of the AND gate 176 and to another input terminal $\overline{\alpha}$ of the AND gate 178 by way of an inverter 179 for reasons which will become more apparent from the following discussion. The logic 1 output signal level from the filled counter 144 is also directed to another input terminal $\alpha$ of the OR gate 122 so as to switch the output from the OR gate 122 from a logic 0 signal level to a logic 1 signal level in the manner previously described upon receipt of the ranging echo.

As is now readily apparent, either receipt of the echo by the rangefinder 22 or the filling of the counter 144 when subjects are located at infinity operates to terminate the "up" count by the counter 144 while simultaneously de-energizing the solenoid 74 to release the shutter blade elements 36 and 38 to commence an exposure cycle. The LED 124 is thereafter energized to provide light 10 milliseconds after the shutter blade elments are released. The de-energization of the solenoid 74 results in clockwise rotation of the walking beam 62 under the biasing force of tension spring 84 from its scene light blocking position as shown in FIG. 3 to its scene light admitting position as shown in FIG. 4. As is readily apparent, the walking beam 62 must be moved through a limited degree of rotation before the primary scene light admitting apertures 44 and 46 overlap to admit the first scene light to the focal plane 14. Whereas the photocell sweep secondary apertures 50 and 52 move in correspondence with the primary apertures 44 and 46, the walking beam 62 must be rotated through a limited number of degrees before the first scene light is also admitted by the secondary apertures 50 and 52 to the photoresponsive element 54.

The LED 124 is aligned with respect to the photoresponsive element 54 on the opposite side of the shutter blade elements 36 and 38 so as to provide illumination detectable by the photoresponsive element 54 when the set of apertures 119 and 121 overlap as shown in FIG. 7 at the instant of initial transmission of scene light through the apertures 46 and 48. As previously described, the LED 124 is energized to provide illumination 10 milliseconds subsequent to the release of the shutter blade elements 36 and 38 (Block L). The 10 millisecond delay in energizing the LED 124 assures that the light from the LED will not be admitted to the photoresponsive element 54 by the third pair of apertures 86 and 88. Thus, regardless of the actual ambient scene light conditions, an indication may be provided as to the first instant at which the primary apertures 44 and 46 overlap to admit scene light to the focal plane 14 by way of the light from the LED 124 being admitted to the photoresponsive element 54 at the instant that the apertures 119 and 121 first overlap.

The photoresponsive element 54 thus responds to the light emitted from the LED 124 at the instant that the second apertures 121 and 119 first overlap to provide an output signal to an integrator circuit 186 by way of a sample and hold circuit 188. The sample and hold circuit 188 samples the output signal from the light responsive element 54 in a well-known manner and thereafter directs the sampled output signal to the integrator circuit 186 unless signaled to hold in a manner to be subsequently described in greater detail herein. The integrator circuit 186 is turned on in coincidence with the LED 124 by way of a switch $S_5$ which opens in response to the receipt of a logic 0 signal level provided by way of an inverter 190 from the 10 millisecond delay circuit 184. In this manner, means are provided for rendering the integrator circuit 186 and the associated level detector circuits LD1, LD2, and LD3 non-responsive to the output of the photoresponsive element prior to the commencement of the exposure interval and, more particularly, during the aforementioned brightness measurement operation. The output from the integrator 186, in turn, is directed to three level detector circuits LD1, LD2 and LD3. The output signal from the level detector LD1 switches from a logic 0 output signal level to a logic 1 output signal level upon the detection of the first light provided by the LED 124. By way of example, the level detector LD1 may be set to trigger upon an input voltage of 0.1 volts.

The logic 1 output signal level from the level detector LD1, in turn, is directed to the NOR gate 123 so as to switch the output therefrom from a logic 1 output signal level to a logic 0 output signal level thereby turning off the LED 124 (Block M).

The output from the level detector LD1 is also directed to the AND gates 168 and 170 to enable one of the AND gates to gate a clock pulse into the counter 144 by way of the OR gate 164 as a result of the previous scene brightness measurement (Block N). As previously discussed, the counter 144 is in a "down" mode and will count down the respective clock pulse provided thereto by the OR gate 164. As is now readily apparent, under low ambient scene light conditions where the scene light intensity is less than 10 Cd/ft$^2$, AND gate 170 will be enabled to gate the 10 KHz clock pulse to the counter 144 and the counter 144 will count down at the same rate at which it previously counted up (Block O). Conversely, under high ambient scene light intensity conditions (above 10 Cd/ft$^2$), the AND gate 168 will be enabled to gate the 15 KHz clock pulse to the counter 144 and will count down at a rate of 1.5 times faster than the rate it previously counted up (Block P).

Under conditions of low ambient scene light intensity of less than 10 Cd/ft$^2$, the counter 144 will empty prior to the output from the light integrator 186 triggering the level detector LD2 (Block Q). When the counter 144 empties, the counter status circuit 146 will switch from a logic 0 output signal level to a logic 1 output signal level thereby providing a logic 1 input signal level to the AND gate 148. The other input signal level at terminal REC to the AND gate 148 is already at a logic 1 signal level by virtue of receipt of the echo signal from the rangefinder 22. Thus, the output signal from the AND gate 148 switches to a logic 1 signal level so as to switch the OR gate 150 to provide a logic 1 output signal thereby disabling the counter 144. The logic 1 output signal from the AND gate 148 is also directed to an OR gate 196 which, in turn, switches to a logic 1 output signal level to trigger a flash fire pulse circuit 198. The flash fire pulse circuit 198, in turn, provides a 29 millisecond flash fire pulse to trigger the strobe 112 and fire its associated flash tube in a well-known manner (Block R).

Thus, the counter 144 by counting down the 10 KHz input clock pulse provides a range responsive timed signal commencing in correspondence with the initiation of the exposure interval and terminating at a subsequent time corresponding to the distance between the camera and the subject to be photographed. Means comprising the counter status circuit 146, the AND gate 148, the OR gate 196 and the flash fire pulse circuit 198 cooperatively respond to the termination of this range responsive timed signal (counter empties) to initiate the energization of the source of artificial illumination (strobe). Thus, in this manner, means are provided for generating a fire flash signal at a determinate time subsequent to the initiation of the exposure interval.

The output signal from the flash fire pulse circuit 198 is inverted by an inverter 200 and directed to one input of an AND gate 202. The input signal to the flash fire circuit 198 is directed to the other input terminal of the AND gate 202. Thus, the AND gate 202 provides a logic 0 output signal level during the 29 millisecond duration of the flash fire pulse from the flash fire pulse circuit 198. Upon termination of the 29 millisecond flash fire pulse, the AND gate 202 switches to provide a logic 1 output signal level which is directed to respective input terminals of the AND gates 176 and 178.

If the subject were previously determined by the rangefinder circuit 22 to be located at infinity, then the AND gate 176 will be enabled by the logic 1 signal level previously applied to its input terminal $\alpha$ and will switch from a logic 0 output signal level to a logic 1 output signal level upon receipt of the logic 1 output signal level from the AND gate 202. The output signal from the AND gate 176 will be thereafter delayed for one second by a delay circuit 204 so as to provide a delayed logic 1 input signal level to an OR gate 206 (Block S). The OR gate 206, in turn, will switch to a logic 1 output signal level thereby providing a command signal to the motor and solenoid control circuit 116 to energize the solenoid 74 and terminate the exposure operation in a well-known manner (Block T).

However, in the event that sufficient scene light is detected by the photoresponsive element 54 and integrated by the integrator 186 to trigger the level detector LD2, prior to the expiration of the aforementioned 1 sec delay, then the exposure will be terminated prior to the 1 sec delay in the following manner (Block U). When the input voltage to the level detector LD2 reaches its threshold voltage, which by way of example may be 0.7 V, the level detector LD2 switches from a logic 0 output signal level to a logic 1 output signal level thereby providing a logic 1 input signal level to a terminal LD2 of an AND gate 214. The input terminal from OR gate 212 to the AND gate 214 is also at a logic 1 signal level by virtue of the AND gate 148 having switched to a logic 1 output signal level when the counter status 146 detected an empty counter 144. The AND gate 214 thus provides a logic 1 signal level to switch the OR gate 206 and provide the exposure terminating command signal, as a result of the triggering of the level detector LD2 prior to the expiration of the aforementioned 1 sec delay. Conversely, if the photographic subject is determined by the rangefinder circuit 22 to be located at a distance from the camera less than infinity, then the AND gate 178 will be enabled to provide a logic 1 output signal level immediately upon receipt of the logic 1 output signal level from the AND gate 202 at the termination of the 29 millisecond time delay. A logic 1 output signal level from the AND gate 178 immediately triggers the OR gate 206 to provide the aforementioned exposure terminating command signal to the motor and solenoid circuit 116 (Block V). Thus, under conditions of low ambient scene light intensity of less than 10 Cd/ft$^2$, the shutter blade elements 36 and 38 are triggered to close 29 milliseconds subsequent to the initiation of the flash fire pulse when the photographic subject is located at distances of less than infinity from the camera and at one second subsequent to the termination of the flash fire pulse when the photographic subject is located at distances equal to infinity (greater than 30 ft) from the camera. Alternatively, the exposure may be terminated prior to the expiration of the one second timing delay if there is sufficient light to cause the light integrator 186 to trip at the level detector LD2.

Under conditions of high ambient scene light intensity greater than 10 Cd/ft$^2$, it can be seen that the brightness measurement circuit 166 provides a logic 1 signal level which enables the AND gate 168 to gate the 15 KHz clock pulse to the OR gate 164 while disabling the AND gate 170 from gating the 10 KHz clock pulse. Thus, the first light that is admitted to the photoresponsive element 54 from the LED 124 operates to trigger the level detector LD1 in the aforementioned manner thereby providing a logic 1 signal level to the input of the AND gate 168 so as to initiate the countdown by the counter 144 in synchronization with the initiation of the film exposure (Block P). In this manner, there is provided a range responsive timed signal commencing in correspondence with the initiation of the exposure interval and terminating at a subsequent time corresponding to the distance between the camera and the subject to be photographed.

In the event that the photographic subject is located close enough to the camera that the counter 144 counts down to empty prior to the output signal from the integrator circuit 186 triggering the level detector LD2, there will occur a change in the output from the counter-status circuit 146 from a logic 0 signal level to a logic 1 signal level as previously discussed. The logic 1 output signal level from the counter status circuit 146 switches the output from the AND gate 148 to a logic 1 output signal level which, in turn, disables the counter 144 in the aforementioned manner.

The output from the AND gate 148, in turn, switches the output from the OR gate 196 to a logic 1 output signal level thereby actuating the flash fire pulse circuit 198 to provide the flash fire pulse to the strobe 112 (Block W). At the same instant that the strobe 112 is fired, there is also actuated a hold pulse circuit 216 which provides a one millisecond holding pulse to the sample and hold circuit 188 by way of an inverter 217.

As previously discussed, prior to the receipt of the holding pulse from the hold pulse circuit 216, the sample and hold circuit 188 operates to sample the output voltage from the light responsive element 54 and to transfer the sampled output voltage directly to the integrator circuit 186. The inverted logic 0 output signal level from the inverter 217 operates to change the mode of the sample and hold circuit 188 from one of sampling to one of holding. Thus, the sampled voltage from the scene light responsive element 54 at the instant prior to the output of the inverter 217 changing from a logic 1 signal level to a logic 0 signal level is held for the one millisecond duration of the holding pulse. The integrator 186 continues to receive the voltage held by the sample and hold circuit 188 regardless of the actual change in voltage from the scene light responsive element 54, and in this manner discounts the artificial illumination provided by the strobe 112. The one millisecond duration of the holding pulse is chosen to be slightly less than the duration of the light pulse from the strobe 112.

Subsequent to the expiration of the one millisecond hold pulse from the hold pulse circuit 216, scene light integration continues and ultimately triggers the level detector LD2 to provide a logic 1 output signal level to the terminal LD2 of the AND gate 214. The logic 1 input signal level to the other input terminal of the AND gate 214 is derived from the OR gate 212 which was previously gated to provide a logic 1 signal from AND gate 148 when the counter 144 emptied. Thus, the AND gate 214 provides a logic 1 output signal level to the OR gate 206 which in turn provides a logic 1 output signal level to command the motor and solenoid control circuit 116 to energize the solenoid 74 and thereby terminate the exposure interval (Block X).

In this manner, means are provided for discounting the artificial illumination provided by the strobe 112 so that a select proportion of the optimum film exposure value is directly provided by ambient scene light while the remaining proportion of the optimum film exposure value is directly attributable to the artificial scene light provided by the strobe 112. In the illustrated embodiment 30 percent of the film exposure may be directly attributable to the artificial scene light provided by the strobe 112 while 70 percent of the film exposure may be directly attributable to the ambient scene light. These proportions are established, for example, by the 0.7 volt trigger level of the level detector LD2 and a 1.0 volt trigger level for another level detector LD3. In other words, level detector LD3 which may be triggered at 1 volt represents an optimum film exposure value so therefore by terminating the exposure interval upon the triggering of level detector LD2 at 0.7 volts subsequent to discounting the artificial illumination provided by the strobe 112 insures that at least 30 percent of the optimum film exposure will be provided by the artificial light from the strobe 112.

Also, it should be readily appreciated that by counting down at the faster clock rate of 15 KHz, there is provided a decrease in the duration of the range responsive timed signal by a constant factor (1.5) in response to a high ambient scene light intensity above 10 $Cd/ft^2$. The decrease in the duration of the range responsive timed signal effects the firing of the strobe 112 at a shorter determinate time subsequent to the commencement of the exposure interval than the time at which the strobe 112 would otherwise be fired under conditions of low ambient scene light intensity of less than 10 $Cd/ft^2$. Whereas the opening speed for the shutter blade elements 36 and 38 is generally constant, it is readily apparent that the strobe 112 is fired sooner and at a smaller aperture during the high ambient scene light intensity mode of operation than during the aforementioned low ambient scene light intensity mode of operation. Preferably, the strobe 112 is fired at a determinate number of smaller aperture stops during the high ambient scene light intensity mode of operation than it would be during the low ambient scene light intensity mode of operation for a subject located at the same distance from the camera.

Photographic subjects may be located at too great a distance from the camera to maintain the aforementioned proportion between ambient and artificial scene light, in which case there is provided a so-called transient mode of operation where the level detector LD2 will be triggered to provide a logic 1 output signal level prior to the counter 144 emptying. In this situation, the integrator circuit 186 will trigger the level detector LD2 to provide a logic 1 output signal level which in turn will trigger the OR gate 196 to provide a logic 1 output signal level, in turn, actuating the flash fire pulse circuit 198 to fire the strobe 112 in the aforementioned manner (Block Y). Simultaneous with the strobe 112 firing, the hold pulse circuit 216 will be actuated in the aforementioned manner to switch the sample and hold circuit 188 from its sampling to its holding mode thereby controlling the integrator 186 to discount the artificial illumination provided by the strobe 112.

In the event that the photographic subject is located close enough to the camera that the counter 144 empties prior to the scene light integrator triggering the level detector LD3, there will be provided a logic 1 input signal level to the OR gate 212 which operates in conjunction with the logic 1 output signal level from the level detector LD2 to switch the AND gate 214 to a logic 1 output signal level in turn, switching the OR gate 206 to provide the exposure terminating command signal to the motor and solenoid control circuit 116 (Block $Z_1$).

Conversely, if the photographic subject is located at such a great distance from the camera that the level detector LD3 will be triggered by the output signal from the integrator 186 prior to the counter 144 emptying, then there will be provided a logic 1 output signal level to the OR gate 212 which, in turn, will provide a logic 1 input signal level to the AND gate 214 which, in turn, will trigger to provide a logic 1 input signal level to the OR gate 206 thereby providing the exposure terminating command signal to the motor and solenoid control circuit 116 (Block $Z_2$). As should be readily apparent, during this transient mode of operation, the proportion of the film exposure value directly attributable to the artificial scene light provided by the strobe 112 decreases from the aforementioned 30 percent in direct correspondence with the increase in the subject-to-camera distance range until the artificial scene light provides no contribution to the film exposure which is the situation when the level detector LD3 switches to provide the exposure terminating command signal prior to the counter 144 emptying.

Other embodiments of the invention, including additions, subtractions, deletions and other modifications of the preferred disclosed embodiments of the invention will be obvious to those skilled in the art and are within the scope of the following claims.

What is claimed is:

1. A photographic camera apparatus of the type adapted to be energized at least in part by a source of electrical energy and including means for defining a film plane comprises:
    a single photoresponsive element stationed to receive light from the scene to be photographed in order to provide an output signal having an electrical characteristic which varies as a function of the intensity of the scene light incident thereon, and
    exposure control means for controlling the admission of scene light to the film plane to define an exposure interval and for controlling the admission of scene light to said photoresponsive element prior to the commencement of said exposure interval and during said exposure interval in correspondence with the scene light admitted to the film plane, said exposure control means also including: means for directing artificial light to impinge upon said photoresponsive element at the instant that said exposure interval is commenced, means responsive to the electrical characteristic of said photoresponsive element upon the receipt thereof of said artificial light at the commencement of said exposure interval for subsequently providing an exposure influencing operation, and subsequently responsive to the electrical characteristic of said photoresponsive element upon the receipt thereof of scene light during said exposure interval for controlling the duration of said exposure interval, and means responsive to the electrical characteristic of said photoresponsive element upon the receipt thereof of scene light prior to the commencement of said exposure interval for controlling the manner in which said exposure influencing operation is provided.

2. The photographic camera apparatus of claim 1 wherein said means for providing said exposure influencing operation includes means for providing a flash fire signal at a determinate time subsequent to the initiation of said exposure interval and said means for controlling the manner in which said exposure influencing operation is provided operates to vary said determinate time.

3. The photographic camera apparatus of claim 2 wherein said exposure control means includes shutter blade means for defining a progressively increasing variation in aperture opening subsequent to the commencement of said exposure interval and wherein said means for varying said determinate time at which said flash fire signal is provided during said exposure interval operates to decrease said determinate time in response to an electrical characteristic from said photoresponsive element indicative of a scene light intensity level above a select value thereby providing said flash fire signal in correspondence with larger aperture openings under conditions of low scene light intensity below said select value than would otherwise occur under conditions of high scene light intensity above said select value.

4. The photographic camera apparatus of claim 3 including means for rendering said means for providing said flash fire signal and for controlling the duration of said exposure interval non-responsive to said electrical characteristic of said photoresponsive element prior to said exposure interval.

5. The photographic camera of claim 4 wherein said means for providing said flash fire signal in response to the electrical characteristic of said photoresponsive element upon the receipt thereof of artificial light at the commencement of said exposure interval and for controlling the duration of said exposure interval in response to the electrical characteristic of said photoresponsive element upon the receipt thereof of scene light during said exposure interval include: means for integrating the electrical characteristic of said photoresponsive element and for providing an output signal indicative of said integration, means responsive to the output signal of said integrating means reaching a first select level for initiating said determinate time interval, and means responsive to the output signal of said integrating means reaching a second select level greater than said first select level for signalling said shutter blade means to terminate said exposure interval.

6. The photographic camera of claim 5 wherein said means for rendering said means for providing said flash fire signal and for controlling the duration of said exposure interval non-responsive to said electrical characteristic of said photoresponsive element includes means for rendering said integrating means inoperative prior to said exposure interval and for rendering said integrating means operative upon the commencement of said exposure interval.

7. The photographic camera of claim 1 wherein said exposure control means includes
    a blade mechanism;
    means for connecting a source of artificial illumination;
    means for mounting said blade mechanism for displacement from a first position wherein said blade mechanism is in scene light blocking relation to the film plane and in scene light and artificial light blocking relation to said photoresponsive element, to a second position wherein said blade mechanism is in scene light blocking relation to the film plane and in scene light unblocking and artificial light blocking relation to said photoresponsive element, and then to a third position wherein said blade mechanism is on the verge of unblocking scene light both to the film plane and to said photoresponsive element and in artificial light unblocking relation with respect to said photoresponsive element, and then to at least one-fourth position wherein said blade mechanism is in scene light unblocking relation with respect to both the film plane and said photoresponsive element and in artificial light blocking relation to said photoresponsive element.

8. The photographic camera of claim 7 wherein said blade mechanism comprises two shutter blade elements each having a primary aperture for admitting scene light to the film plane and first, second and third photocell apertures for admitting scene light and aritificial light to said photoresponsive element wherein: said first photocell apertures from respective blade elements overlap to admit scene light to said photoresponsive element when said blade elements are in said second position, said second photocell apertures from respective blade elements overlap to admit artificial light to said photoresponsive element when said blade elements are in said third position, and said third photocell apertures from said respective blade elements overlap to admit scene light to said photoresponsive element when said blade elements are in said fourth position in concert with said primary apertures from respective blade elements which overlap to admit scene light to the film plane.

* * * * *